T. BARRETT.
AIRSHIP.
APPLICATION FILED APR. 7, 1920.
1,427,998.
Patented Sept. 5, 1922.
2 SHEETS—SHEET 2.
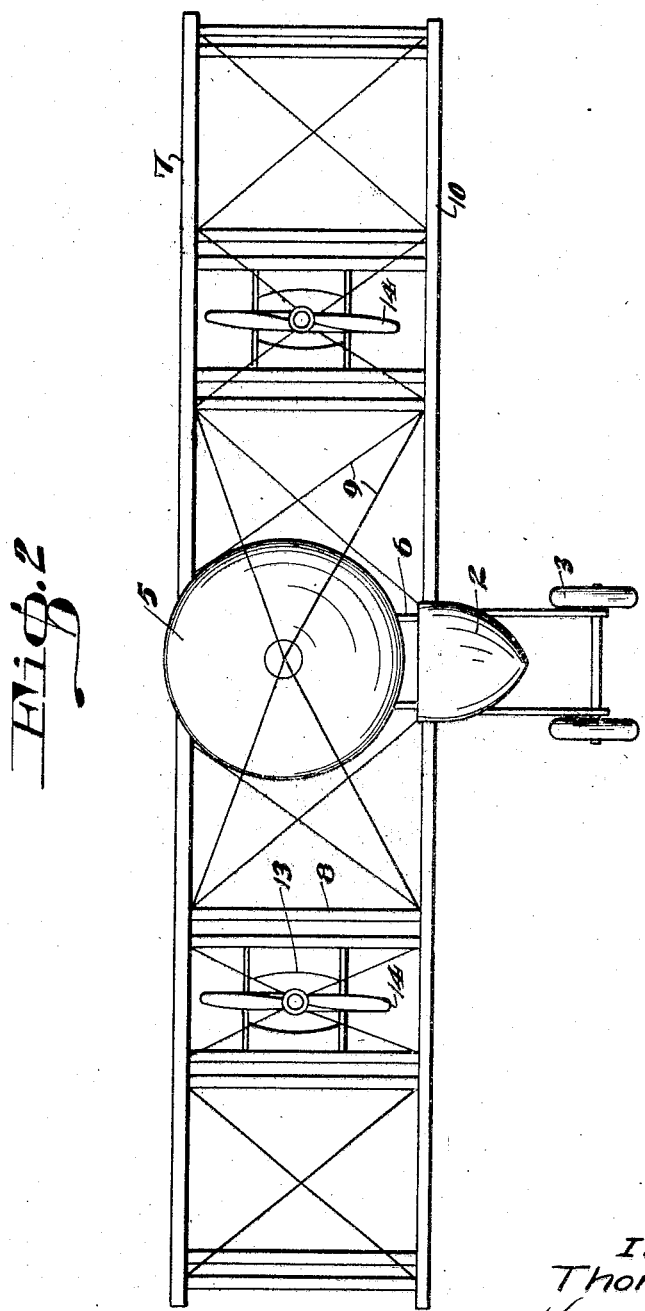
INVENTOR
Thomas Barrett
By Hazard & Miller
Att'ys.

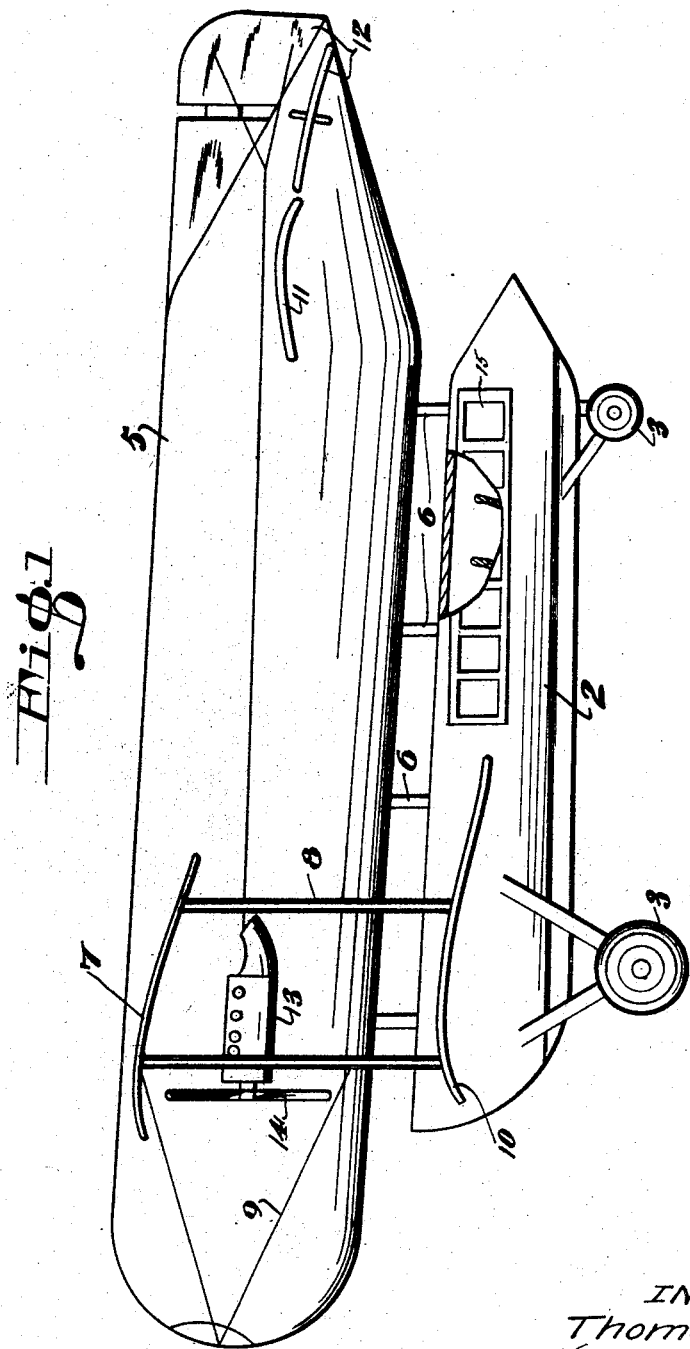

Patented Sept. 5, 1922.

1,427,998

UNITED STATES PATENT OFFICE.

THOMAS BARRETT, OF PASADENA, CALIFORNIA, ASSIGNOR OF ONE-TWENTIETH TO WALTER M. MURPHY, OF PASADENA, CALIFORNIA.

AIRSHIP.

Application filed April 7, 1920. Serial No. 372,001.

*To all whom it may concern:*

Be it known that I, THOMAS BARRETT, a subject of the King of Great Britain, residing at Pasadena, in the county of Los Angeles and State of California, have invented new and useful Improvements in Airships, of which the following is a specification.

This invention relates to an aerial apparatus and has for its object to provide an aerial apparatus of the lighter than air type by adding to it the now efficient airplane structure and motor driven propelling means. It is also an object to provide a device that may be utilized for traveling on land, and in water and in air, and the invention consists of the construction, the combination and in details and arrangements of the parts an embodiment of which invention is illustrated in the accompanying drawings and described and claimed herein.

Figure 1 is a side elevation of the improved aerial apparatus showing the gondola partly broken away to indicate the passenger carrying cabin.

Fig. 2 is a front end view of the apparatus.

The improved airship consists of a gondola or boat body 2 preferably built on stream-line construction to reduce air resistance, and the gondola is shown as having ground wheels 3 enabling it to be propelled when necessary, and for starting purposes, over land surface.

The gondola is shown as connected to a gas bag 5 which is preferably of such volume as to have just sufficient capacity to render buoyant in air the entire organization with the given load. The gas bag is shown as substantially cigar-shaped in form and is connected by standards or framework 6 extending from the top of the gondola 2.

To facilitate flying and direction of movement of the airship there is provided airplanes or wings of the standard type of construction, the upper wings being indicated at 7 and extending laterally from and transversely to the body of the gas bag, in a plane at the upper portion of the gas bag. The planes are connected to a frame structure including trussed struts 8 the whole of which may be braced by guy wires 9. These guy wires are connected to the airplane structure and extend therefrom to the forward end of the gas bag 5 which projects in front of the air-plane structure. There may be provided a lower plane structure 10, in this case, projecting laterally from the gondola 2. There may be provided rear transversely extending planes 11 mounted at the rear end of the gas bag 5, and suitable vertical and horizontal rudders 12 are provided in this case at the end of the gas bag.

For propelling the device a suitable motor or motors indicated at 13 may be utilized, and in this case the motors are arranged in the framework and between the upper and lower planes 7—10 and the shafts of the engine 13 are provided with propellers 14.

The gondola is provided with a usual passenger carrying space 15 preferably arranged at the rear end of the gondola. The gondola extends along an appreciable length of the gas bag and by providing the passenger carrying space at the rear end thereof, it will be seen that a balanced structure is provided which is adapted to maintain the gas bag in a horizontal position, since the weight of the gondola is positioned toward its rear end by providing the passenger carrying space at its end, while the weight of the airplane structure and the engines carried thereby is mounted at the forward part of the assembled machine.

From the above it will be seen that I have provided a device combining the very efficient airplane structure now well known and common and utilizing therewith a gas bag of such capacity as to render the entire organization buoyant in air so that a minimum amount of power will be required for lifting purposes and the energy of the motor or motors may be consumed for propelling the device.

Again it will be obvious that by employing a gas bag having a lifting capacity sufficient to lift the weighted organization, that the device can be driven upwardly very rapidly and also in the event of loss of power, for any reason, the buoyant nature of the airship will enable the safe landing thereof with its passengers.

Various changes may be made without departing from the spirit of the invention as claimed.

What is claimed is:

An airship comprising a gas bag having the capacity of rendering the loaded organization buoyant in air, guiding mechanism carried by said gas bag, a gondola depending from said bag and adapted to float the loaded organization in water, an airplane structure mounted upon said gas bag and gondola said structure having propelling mechanism, and landing wheels carried by said gondola.

In testimony whereof I have signed my name to this specification.

THOMAS BARRETT.